US011992855B2

(12) United States Patent
Joseph et al.

(10) Patent No.: US 11,992,855 B2
(45) Date of Patent: May 28, 2024

(54) FLUID DELIVERY ASSEMBLY FOR A SPRAYING APPARATUS

(71) Applicant: 3M INNOVATIVE PROPERTIES COMPANY, St. Paul, MN (US)

(72) Inventors: Stephen C.P. Joseph, Woodbury, MN (US); Anna M. Hegdahl, Maple Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 14 days.

(21) Appl. No.: 17/881,464

(22) Filed: Aug. 4, 2022

(65) Prior Publication Data

US 2022/0371035 A1 Nov. 24, 2022

Related U.S. Application Data

(63) Continuation of application No. 17/418,711, filed as application No. PCT/IB2019/061242 on Dec. 21, 2019, now Pat. No. 11,458,491.

(Continued)

(51) Int. Cl.
*B05B 7/24* (2006.01)
*B65D 25/16* (2006.01)
*B65D 43/08* (2006.01)

(52) U.S. Cl.
CPC ............ *B05B 7/2478* (2013.01); *B65D 25/16* (2013.01); *B65D 43/08* (2013.01); *B05B 7/2481* (2013.01); *B65D 2543/00435* (2013.01)

(58) Field of Classification Search
CPC ........ B65D 25/16; B65D 25/14; B65D 25/48; B65D 25/40; B65D 21/0233;

(Continued)

(56) References Cited

U.S. PATENT DOCUMENTS 3,401,842 A 9/1968 Morrison
4,122,973 A 10/1978 Ahern (Continued)

FOREIGN PATENT DOCUMENTS

WO 1998032539 A1 7/1998
WO 2001012337 A1 2/2001

(Continued)

OTHER PUBLICATIONS

International Search Report for PCT International Application No. PCT/IB2019/061242, mailed on Apr. 17, 2020, 5 pages.

*Primary Examiner* — Robert J Hicks
(74) *Attorney, Agent, or Firm* — Jonathan V. Sry

(57) ABSTRACT

The present invention relates to a fluid delivery assembly for a spraying apparatus. The assembly comprises an outer cup, a lid having a fluid outlet adapted to couple the lid to the spraying apparatus, and a liner for holding paint. The fluid delivery assembly comprises an interlocking keyed geometry adapted to prevent rotation of at least one of the lid and the liner with respect to the cup. The interlocking keyed geometry comprises at least one of (a) at least one protrusion of the cup extending into at least one recess of the lid, and (b) at least one protrusion of the lid extending into at least one recess of the cup, wherein the liner is trapped between the protrusion and the recess. The invention also relates to liners for such fluid delivery assemblies, which may be provided as a set of liners having different inners volumes.

11 Claims, 7 Drawing Sheets

Related U.S. Application Data

Figure 1:
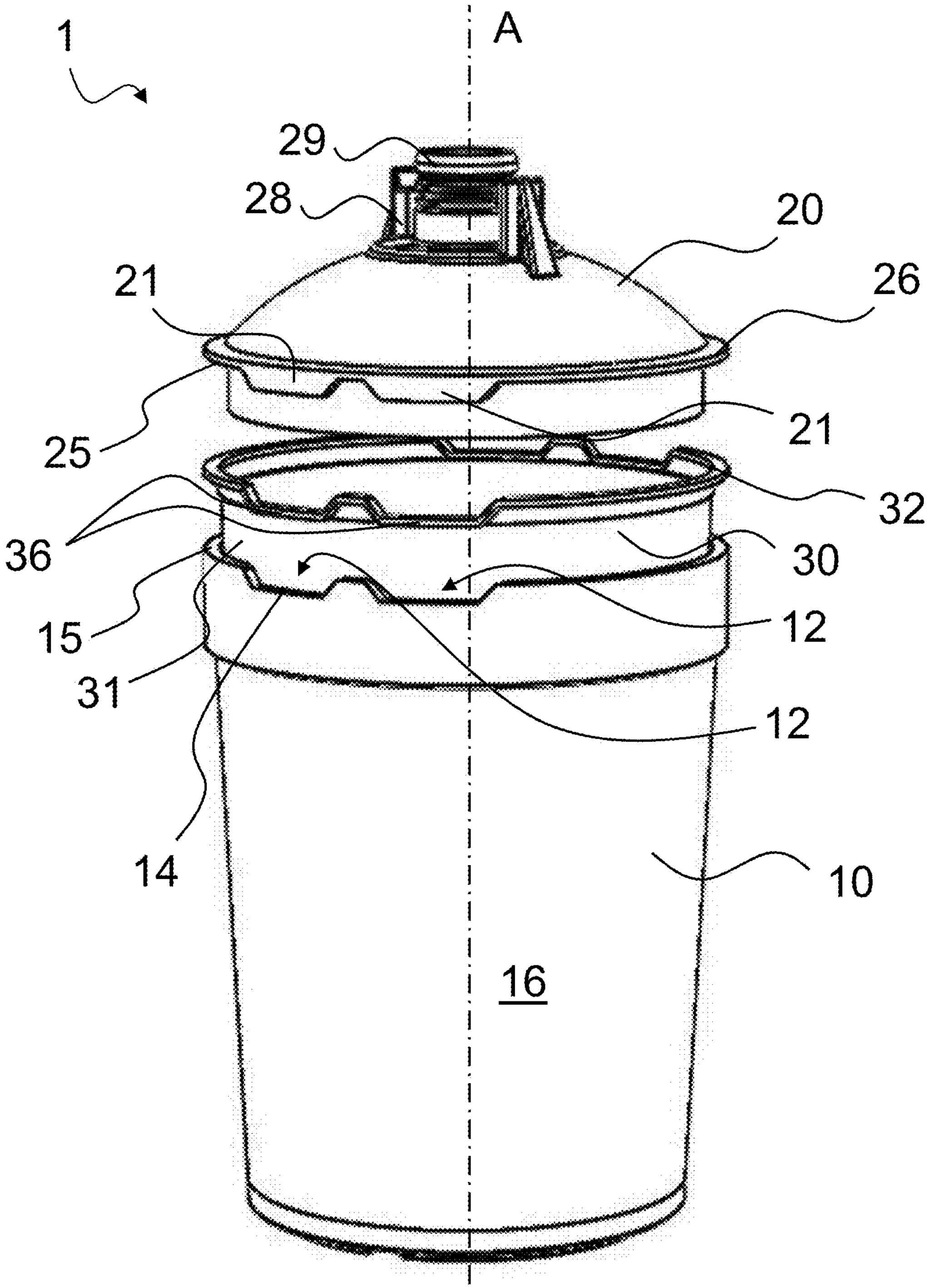

(60) Provisional application No. 62/785,296, filed on Dec. 27, 2018.

(58) Field of Classification Search
CPC .................. B65D 90/046; B65D 43/08; B65D 2543/00435; B65D 2543/00009; B05B 7/2478; B05B 7/2481
USPC ... 220/495.06, 495.02, 495.01, 23.89, 23.87, 220/23.83; 239/591; 222/570, 567
See application file for complete search history.

(56) References Cited

U.S. PATENT DOCUMENTS

| | | | |
|---|---|---|---|
| 5,150,804 | A | 9/1992 | Blanchet et al. |
| 5,240,133 | A | 8/1993 | Thomas, Jr. |
| 8,167,171 | B2 | 5/2012 | Moretti |
| 8,196,770 | B2 | 6/2012 | Kosmyna et al. |
| 9,259,960 | B1 | 2/2016 | Tepsi et al. |
| 2010/0187234 | A1 | 7/2010 | Saranga |
| 2012/0273583 | A1* | 11/2012 | Gerson ................. B05B 7/2481 222/105 |
| 2013/0105598 | A1 | 5/2013 | Shultz et al. |
| 2015/0108135 | A1 | 4/2015 | Hanna et al. |
| 2015/0321835 | A1 | 11/2015 | Holbrook et al. |
| 2016/0303594 | A1 | 10/2016 | Nyaribo et al. |
| 2017/0203887 | A1 | 7/2017 | Hegdahl et al. |
| 2018/0251264 | A1 | 9/2018 | Shafer |

FOREIGN PATENT DOCUMENTS

| | | | |
|---|---|---|---|
| WO | 2004037433 | A1 | 5/2004 |
| WO | 2005120718 | A1 | 12/2005 |
| WO | 2006055138 | A1 | 5/2006 |
| WO | 2008069213 | A1 | 6/2008 |
| WO | 2009073718 | A1 | 6/2009 |
| WO | 2014182722 | A1 | 11/2014 |
| WO | 2015178914 | A1 | 11/2015 |
| WO | 2016069239 | A2 | 5/2016 |
| WO | 2016069674 | A1 | 5/2016 |
| WO | 2017074709 | A1 | 5/2017 |
| WO | 2017074817 | A1 | 5/2017 |
| WO | 2017123707 | A1 | 7/2017 |
| WO | 2017123708 | A1 | 7/2017 |
| WO | 2017123709 | A1 | 7/2017 |
| WO | 2017123714 | A1 | 7/2017 |
| WO | 2017123715 | A1 | 7/2017 |
| WO | 2017123718 | A1 | 7/2017 |
| WO | 2017189681 | A1 | 11/2017 |
| WO | 2017189684 | A1 | 11/2017 |
| WO | 2018109594 | A1 | 6/2018 |

* cited by examiner

FLUID DELIVERY ASSEMBLY FOR A SPRAYING APPARATUS

BACKGROUND

Various fluid delivery assemblies for spray guns are known in the art. In the collision repair industry, fluid delivery assemblies that allow the mixing of paint directly therein are widely used. One example is the PPS™ system by 3M (Maplewood, Minnesota, U.S.), which employs a re-usable outer cup and collar. A disposable liner is provided in the outer cup in order to mix paint therein. The disposable liner may be closed with a disposable filter lid. Such systems are disclosed, for example, in applicant's WO 98/32539 A1 (which is incorporated by reference herein in its entirety). Other types of fluid delivery assemblies are known, for example, from U.S. Pat. No. 8,196,770 B2 to Kosmyna et al. and from U.S. Pat. No. 9,259,960 B1 to Tepsi et al., both of which are incorporated by reference herein in their entirety.

US 2016/0303594 A1 to Nyaribo et al., equally incorporated herein by reference in its entirety, discloses fluid liners and spraying apparatus. The disclosed liners include a sidewall defining a fluid-containing portion and an open end. A flange extends outwardly from the sidewall. The flange has a latching member coupled thereto for releasably coupling the sidewall to a lid that is compatible with the liner.

Also, liners for buckets are known. Such liners are disclosed, for example, in U.S. Pat. No. 4,122,973 A to Ahern, U.S. Pat. No. 5,150,804 A to Blanchet et al., and US 2010/0187234 A1 to Saranga, all of which are incorporated by reference herein in their entirety. Also sealed containers are known in the art, for example from U.S. Pat. No. 5,240,133 to Thomas and WO 2014/182722 A1 to Heyn.

SUMMARY

The present invention relates to a fluid delivery assembly for a spraying apparatus with an outer cup, a lid and a liner, the assembly being provided with an interlocking keyed geometry, as well as to a liner with keyed features. The liner may be used for lining the outer cup. The liner may be used for holding paint. For example, the liner may hold paint in a manner that prevents said paint from getting into contact with the outer cup. The outer cup may not be intended and/or may not be suitable for holding paint unless the liner is inserted therein.

Furthermore, the present invention may also relate to a paint spray gun, in particular a gravity fed paint spray gun, comprising such fluid delivery assembly. The fluid delivery assembly may be configured to be connected to a spray gun directly or through one or more adapters.

The invention may also relate to methods of using the liner in such fluid delivery assembly and/or in such paint spray gun (e.g., a gravity fed spray gun). In particular, the present invention may also relate to methods for mixing paint directly in such liner, for example when the liner is placed in the outer cup.

It is an object of the present invention to improve known fluid delivery assemblies. More specifically, it is an object of the present invention to provide a fluid delivery assembly and liner that may be assembled more easily and/or securely while still being simple and economical to manufacture. Even more specifically, it is an object of the present invention to provide a fluid delivery assembly and liner that may be more easily assembled in a secure manner and may be reliably attached to a spray gun, for example to a gravity fed spray gun.

The above-mentioned objects are achieved by the improved fluid delivery assemblies and liners according to the claims. Further aspects, improvements and variations are disclosed in the figures and the description.

In the context of the present disclosure, the term "paint" is used herein to include all forms of paint-like coating materials that can be applied to a surface using a spray gun, whether or not they are intended to color the surface. The term includes, for example, primers, base coats, lacquers and similar coating materials.

The liners according to the present invention may be thermo/vacuum formed. As far as reference is made to "thermo/vacuum forming" (in particular to liners produced by such "thermo/vacuum forming"), this means a process by which a sheet of polymeric (e.g., thermoplastic) material is heated to a softened condition (e.g., to its thermoplastic softening point) and formed into a desired shape, defined by a mold, while in that softened condition. It includes the case in which the application of a differential air pressure is used to assist in forming the material into the required shape. It may include the case in which a vacuum is produced on one side of the sheet to assist in forming it into the required shape (also known simply as "vacuum forming") and/or pressure is produced on the opposite side of the sheet to assist in forming it into the required shape. It may include the case where a male plunger is employed on the relatively higher pressure side to assist in forming it into the desired shape.

The use of vacuum is thus not necessarily required when "thermo/vacuum forming". In particular, it may be sufficient to apply positive pressure (in particular, positive air pressure) on one side of the sheet (e.g., on the side of the sheet facing away from a female cavity of a thermo/vacuum forming tool). On the opposite side of the sheet (e.g., on the side of the sheet facing towards the female cavity) a reduced pressure but also ambient pressure may be provided.

The liners according to the present invention preferably are thermo/vacuum formed from a polymeric material. The liner may be made from, for example, polyethylene (e.g., low density polyethylene or high density polyethylene) or polypropylene. The liner may be formed from a blend of polymeric materials, for example a blend of polyethylene and polypropylene, or a blend of low density polyethylene and linear low density polyethylene. The liner may optionally be thermo/vacuum formed from a thermoplastic material.

The liner may alternatively or additionally comprise coatings and/or additives and/or material formulations which render an interior surface thereof repellent to paint. For example, the liner may comprise material as described in WO 2016/069674 A1 to Meuler et al.; WO 2016/069239 A1 to Meuler et al.; WO 2017/074817 A1 to Meuler et al.; WO 2017/074709 A1 to Elsbernd et al.; WO 2017/189684 A1 to Meuler et al. and/or WO 2017/189681 A1 to Meuler et al., the disclosures of which are hereby incorporated by reference in their entirety.

Various technical approaches can be used to render the surface repellent to paint. The repellent surface may be characterized by a receding contact angle with a solution of 10% by weight 2-n-butoxyethanol and 90% by weight deionized water that is at least 35, 36, 37, 38, 39, 40, 41, 42, 43, 44, 45, 46, 47, 48, 49, 50, 55, 60, 65, or 70 degrees. The paint repellent surface may comprise a lubricant impregnated into pores of a porous layer as described in WO 2016/069674 A1. The repellent surface may comprise a (e.g. non-fluorinated) organic polymeric binder and a siloxane (e.g. polydimethylsiloxane "PDMS") material as described in WO 2017/189684 A1. The repellent surface may comprise a (e.g. non-fluorinated) organic polymeric binder and a fluorochemical material as described in WO 2016/069674 A1. The repellent surface may comprise a fluoropolymer as described in WO 2016/069674 A1.

The liners according to the present invention may be self supporting. As far as reference is made to "self supporting", this defines an element or structure which does not collapse under the influence of gravity alone. In other words, a "self supporting" element or structure in the context of the present invention may be a structure that maintains (or at least generally maintains) its shape under the influence of gravity. A "self supporting" liner, for example, may have a total height along its longitudinal axis. When the liner is supported on and/or via its base, this total height may be reduced by less than 5%, preferably less than 2%, or even less than 1% under the influence of gravity alone. Alternatively or additionally, a "self supporting" liner in the context of the present disclosure may be a liner which, when being held (e.g., between two fingers of a hand) at only one point along a top edge or a flange thereof, does not collapse and/or does not substantially deform under the influence of gravity alone. Even further, alternatively or additionally, such liners may be stood upside down on a top edge or flange thereof without deforming and/or collapsing under the influence of gravity alone.

The liners according to the present invention may be self-supporting but at the same time collapsible, for example when paint is withdrawn from the fluid delivery assembly. Such liners may be produced by thermo/vacuum forming.

The outer cup and/or the lid of the fluid delivery assemblies according to the present invention may be rigid. The term "rigid" is used to define structures that do not collapse as fluid is withdrawn from the fluid delivery assembly (for example via a spray gun). Moreover, containers and other structures defined as "rigid" may be too stiff to be compressed by manual pressure alone.

According to a first aspect, the invention relates to a fluid delivery assembly for a spraying apparatus, the assembly comprising an outer cup, a lid having a fluid outlet adapted to couple the lid to the spraying apparatus, and a liner for holding paint. The fluid delivery assembly comprises an interlocking keyed geometry adapted to prevent rotation of at least one of the lid and the liner with respect to the cup. Preferably, the interlocking keyed geometry comprises at least one of (a) at least one protrusion of the cup extending into at least one recess of the lid, and/or (b) at least one protrusion of the lid extending into at least one recess of the cup. The one or more recesses of the lid and/or outer cup may also be referred to as one or more pockets in the context of the present invention. The fluid delivery assembly may comprises a plurality of protrusions and/or a plurality of recesses.

The liner may comprise one or more liner sidewalls and a liner base. The one or more sidewalls may form a peripheral sidewall of the liner, which may be closed by the liner base. The liner sidewalls and the liner base may be integrally formed. For example, the liner sidewalls and the liner base may be formed from a single sheet of polymeric material (in particular, via a thermo/vacuum forming process). The liner sidewall(s), for example when using a thermo/vacuum forming process, may have a material thickness of 400 μm or less, preferably 300 μm or less, more preferably 250 μm or less. Similarly, the liner base, for example when using a thermo/vacuum forming process, may have a material thickness of 400 μm or less. Preferably, the liner sidewall(s) and/or the liner base have a material thickness of at least 25 μm, more preferably at least 100 μm. The liner may extend along a liner longitudinal axis, which may be substantially perpendicular to the liner base. The sidewalls may be tapered, in particular slightly tapered, towards the base. The sidewall(s) and/or the base of the liner may be transparent or translucent, or in some examples, opaque.

The liner may further comprise an open liner top end. The liner top end may be delimited by the sidewall(s) and/or by a liner flange or rim. The liner flange may extend from the peripheral sidewall, for example from a top end thereof. The liner flange may be integrally formed with the peripheral sidewall. The liner flange may extend arcuately around at least a segment of the liner, for example around at least a segment of the liner's top end. The liner flange may extend entirely around the liner. The liner flange and/or the liner may be devoid of through holes.

The material thickness of the liner flange may be greater than the material thickness of the liner base and/or greater than the material thickness of the one or more liner sidewalls. For example, the material thickness of the liner flange may be 400 μm or more, preferably 600 μm or more. The material thickness of the liner flange preferably is less than 1.5 mm, more preferably less than 1 mm. However, the liner flange could also be omitted.

The at least one protrusion of the cup and/or the at least one protrusion of the lid may be configured to extend into the recess of the lid or the recess of the cup, respectively. The liner, in particular the flange of the liner, is preferably configured to extend into the recess of the cup and/or into the recess of the lid.

The liner preferably is trapped between the protrusion and the recess. More specifically, the liner may be clamped between the protrusion and the recess. In particular, the liner flange may be trapped between the one or more protrusions and the one or more recess of the outer cup and/or lid.

The liner may be deformed by the protrusion into the recess. For example, the liner flange may be deformed by the protrusion into the recess.

Additionally or alternatively to such deformation, the liner may comprise a keyed feature that is configured to be located in the recess. Such keyed feature may be pre-formed into the liner, for example into the liner flange and/or into a portion of the liner's peripheral sidewall. The keyed feature may be provided by a bulge or a protruding section of the liner flange and/or sidewall.

The keyed feature may be configured to interlock with the recess to prevent rotation of the liner with respect to the recess, in particular with respect to the one or more recesses of the outer cup and/or with respect to the one or more recesses of the lid. Alternatively or additionally, the protrusion, in particular the at least one protrusion of the outer cup and/or the at least one protrusion of the lid, may be configured to extend into the keyed feature. As such, the keyed feature may be configured to interlock with the at least one protrusion to prevent rotation of the liner with respect to the at least one protrusion. In other words, the keyed feature may prevent rotation of the liner with respect to the outer cup and/or the lid.

The fluid delivery assembly may have a longitudinal axis. The liner flange preferably extends from a first plane to a second plane. The first and/or second plane may be perpendicular to said longitudinal axis. The first and second planes may be parallel to each other. The first and second planes preferably are spaced apart from each other in the longitudinal direction of said longitudinal axis by at least 2 mm, more preferably by at least 3 mm. However, the first and second planes may also be inclined with respect to each other, for example at different angles relative to the longitudinal axis. In this case, the spacing of the planes if preferably provided in the region of the keyed feature.

The liner flange may have a non-planar geometry. For example, the liner flange may include one or more angled portions or sharp bends. The liner flange may also be considered to be angled at one or more locations.

Preferably, a trajectory along which the liner flange arcuately extends around the liner includes at least one first segment that extends perpendicularly or obliquely to the first plane. For example, the first segment may extend at an angle of at least 10°, at least 20°, or at least 30° with respect to the first plane. The first segment may extend in a plane that passes through the inner volume of the liner. Preferably, the first segment is at least 2 mm long, at least 3 mm long, or at least 4 mm long. Alternatively or additionally, the first segment may be 15 mm long or shorter, 10 mm long or shorter, or 7 mm long or shorter. The liner flange may comprise a plurality of first segments.

The trajectory of the liner flange around the liner may include at least one second segment that extends in the second plane. The second segment may be longer than the first segment. The second segment may be, for example, at least 5 mm, at least 7 mm or at least 10 mm long. Alternatively or additionally, the second segment is 40 mm long or shorter, 30 mm long or shorter, or 20 mm long or shorter. The liner flange may comprise a plurality of second segments.

The trajectory of the liner flange around the liner may include at least one third segment that extends in the first plane.

The outer cup may be configured to receive the liner, for example when mixing paint in the fluid delivery assembly. Alternatively or additionally, the outer cup may be configured to receive the liner when spraying paint from the fluid delivery assembly. The outer cup may be relatively rigid, in particular more rigid than the liner. The outer cup may be configured to maintain its shape and/or to be non-collapsible as fluid is withdrawn from the fluid delivery assembly. It is to be noted, however, that the outer cup may also be dispensed with under certain circumstances. For example, the fluid delivery assembly according to the present invention may be configured for spraying without such outer cup. For this purpose, an additional mounting ring may be attached to the liner. Such additional mounting ring may be inserted into the outer cup when assembling the fluid delivery assembly and may thus be considered to form part of the outer cup in the context of the present disclosure. Once the assembly is assembled and/or paint has been mixed therein, the liner, mounting ring and lid may be removed from the remaining outer cup, for example for spraying the paint.

The outer cup may comprise one or more outer cup sidewalls. The outer cup sidewall(s) may form a peripheral sidewall of the outer cup. The recess or recesses of the outer cup may be located in said peripheral sidewall. Alternatively or additionally, the protrusion or protrusions of the outer cup may extend from said peripheral sidewall.

The outer cup may comprise an outer cup base, but such base could also be omitted. The outer cup base may be provided with one or more spacing features (which may comprise protrusions) for spacing the base from an underlying support surface.

The outer cup may have an outer cup top end, which may be open. The outer cup top end may be configured for inserting the liner therethrough.

The outer cup may be provided with a locking arrangement, for example an internal or external threading or a bayonet connection, for engaging with a lid, a collar, a mounting ring or any other type of locking member suitable to hold the liner and/or the lid attached to the outer cup. Such threading or bayonet connection may be provided along a top portion of the outer cup sidewall(s), in particular proximate to the outer cup top end.

The outer cup may have an outer cup longitudinal axis, which may extend through the outer cup base and the outer cup top end. The outer cup longitudinal axis may be parallel or congruent with a liner longitudinal axis when the liner is received in the outer cup.

The outer cup may be made from, for example, polyethylene or polypropylene. The outer cup base and/or the outer cup sidewall(s) may be transparent or translucent. The sidewall(s) of the outer cup may be provided with one or more scales. The scale(s) on the outer cup may allow the user to assess volumes of liquids poured into the liner. The scale(s) may be configured to correctly reflect volumes of liquid poured into the liner even in cases where the liner differs in shape from the outer cup. The scale(s) may also be configured to indicate how much liquid remains in the outer cup and/or liner when spraying, for example to indicate how much liquid remains in the outer cup and/or liner when the spray gun is held with the nozzle pointing in a direction between horizontally and downwards (e.g. pointing horizontally or downwardly). The sidewall(s) of the outer cup may slightly taper towards the outer cup base.

The outer cup may provide a support structure that supports the liner in the outer cup. The support structure may support the liner in the outer cup such that the liner base does not contact (or just contacts, and/or is not proud of) an underlying support surface (e.g., a table) on which the outer cup is standing. For example, the liner flange may be supported on the support structure of the outer cup. Such support structure for the flange may be formed, for example, by an edge and/or by a step of the outer cup. Such edge and/or step may be formed along the outer cup's peripheral sidewall, in particular along a top portion and/or along an inner portion of the peripheral sidewall. Such edge may also be provided by a top rim of the outer cup, in particular by a top rim of the peripheral sidewall. Alternatively or additionally, the liner may be supported on one or more spacing features (e.g., protrusions) provided along the peripheral sidewall and/or on one or more indentations provided along the peripheral sidewall.

Outer cups embodying certain features described above are disclosed, for example, in WO 2017/123708 A1 to Hegdahl et al. entitled "Spray Gun Cups, Receptacles, and Methods of Use"; in WO 2017/123707 A1 to Pitera et al. entitled "Modular Spray Gun Lid Assemblies and Methods of Design and Use"; in WO 2017/123709 A1 to Hegdahl et al. entitled "Spray Gun Cups, Receptacles, Lids, and Methods of Use"; and in U.S. patent application Ser. No. 15/375,556 to Hegdahl et al. entitled "Reservoir Systems for Hand-Held Spray Guns and Methods of Use", the disclosures of which are hereby incorporated by reference in their entirety.

The fluid delivery assembly according to the present invention may comprise at least one removable lid. The lid may have an outlet that is adapted for connection to an inlet of the spray gun or to an inlet of an adapter connected to the spray gun. The lid may at least partially cover the liner top end. The lid may be funnel-shaped and may comprise a first, wider end adapted to couple to the liner and/or to the outer cup as well as a second, narrower end that forms the fluid outlet.

The lid may be disposable and may be formed from a polymeric material (for example polyethylene or polypropylene). A translucent or transparent material may be chosen for the lid. The lid may be provided with a filter for filtering the paint as it is withdrawn from the fluid delivery assembly thorough the fluid outlet.

The lid may seal the liner in a liquid-tight and/or air-tight manner. In particular, the lid may seal with a top portion of the liner in such liquid-tight and/or air-tight manner. As will be apparent to the skilled reader, the lid may be connected to the liner and/or to the outer cup in various manners. For example, the lid may be snap-fitted to the liner and/or snap-fitted to the outer cup. For example, the lid may comprise one or more latching members, for example resilient hooks and/or foldable hooks and/or hooks rotating around a hinge axis, that may be configured to engage with the outer cup and/or with the liner. Alternatively or additionally, the outer cup may be provided with one or more latching members, for example resilient and/or foldable hooks, that may be configured to engage with the lid. Such hooks may be provided in addition to or instead of other connections mechanism, such as a corresponding threading or bayonet connection on the outer cup and lid and/or on the liner and lid.

The connection between the lid and the liner, as well as optionally the connection between the lid and the outer cup, may be configured such that the liner is removable from the spray gun and/or removable from the outer cup with the lid attached to the liner. This may allow the user to dispose of the liner with the lid attached, thus minimizing the risk of spilling paint.

The lid may comprise a central portion (in which the fluid outlet may be provided) and a peripheral portion (which may be the portion sealing with the liner and/or the portion attaching the lid to the outer cup and/or to the liner). The central and peripheral portions may be connected by a transverse portion.

The transverse portion may be provided with hook coupling means, which may be integrally formed with the lid. The hook coupling means may be arranged externally of the fluid outlet. For example, the hook coupling means may be spaced from said fluid outlet by a predetermined distance. The hook coupling means are preferably provided with inwardly extending lips, preferably lips extending towards the fluid outlet. The inwardly projecting lips may extend over a surface of a collar, which collar may be provided by the inlet of the spray gun or by an adapter attached to the inlet. The collar is preferably an external collar. Details of such connections and other connections that may be relied upon in the context of the present invention are disclosed, for example, in applicant's WO 01/12337 and applicant's WO 2004/037433, which are both incorporated herein by reference in their entirety.

The peripheral portion may include a cylindrical portion that may be inserted into the liner when the fluid delivery system is assembled.

The lid may comprise an outwardly extending lid flange that may extend, for example, from the peripheral portion. The lid flange may be configured to be pressed onto the liner when the fluid delivery system is assembled, in particular onto the liner flange. The one or more recesses of the lid may be provided along and/or located in said lid flange. Alternatively or additionally, the one or more projections of the lid may be provided along and/or extend from said lid flange.

Lids embodying certain features described above are disclosed, for example, in WO 2017/123708 A1 to Hegdahl et al. entitled "Spray Gun Cups, Receptacles, and Methods of Use"; in WO 2017/123707 A1 to Pitera et al. entitled "Modular Spray Gun Lid Assemblies and Methods of Design and Use"; in WO 2017/123709 A1 to Hegdahl et al. entitled "Spray Gun Cups, Receptacles, Lids, and Methods of Use"; in WO/2017/123714 A1 to Hegdahl et al. entitled "Wide-Mouthed Fluid Connector for Hand-Held Spray Guns"; in WO 2017/123715 A1 to Ebertowski et al. entitled "Button-Lock Fluid Connector for Hand-Held Spray Guns"; in WO 2017/123718 A1 to Ebertowski et al. entitled "Connector System for Hand-Held Spray Guns"; and in U.S. patent application Ser. No. 15/375,556 to Hegdahl et al. entitled "Reservoir Systems for Hand-Held Spray Guns and Methods of Use", the disclosures of which are hereby incorporated by reference in their entirety.

The protrusion, in particular the at least one protrusion of the outer cup and/or the lid, may comprise an upwardly or downwardly facing end surface. The liner may extend around said end surface. In other words, the liner may extend around the at least one protrusion.

Alternatively or additionally, the at least one recess, in particular the at least one recess of the outer cup and/or the lid, may comprise a peripheral wall. The liner may be configured to extend along said peripheral wall of the recess at least along a segment thereof. The liner flange may contact the peripheral wall of the recess. For example, the liner flange may contact the peripheral wall at least along 50%, 60% or 80% of the peripheral wall's arcuate length around the longitudinal axis of the assembly.

The lid may be provided with one or more sealing features configured to seal with the liner. For example, such sealing features may be provided by one or more radially extending annular sealing projections. Such one or more sealing projections may extend from the cylindrical portion of the lid that extends into the liner. When the at least one protrusion is provided on the lid, the sealing features may be positioned below the protrusion. For example, the sealing features may be positioned below the downwardly facing end surface of the protrusion.

Whether provided on the lid and/or the outer cup, the one or more protrusions may protrude upwardly or downwardly in the direction of the longitudinal axis of the assembly. In other words, the one or more protrusion(s) may protrude in a non-radial manner. The one or more protrusions may protrude by, for example, 2 mm, 3 mm, or 4 mm upwardly or downwardly.

Furthermore, whether provided on the lid and/or the outer cup, the one or more recesses may be open in an downward or upward direction along the longitudinal axis. Each of the one or more protrusions may be configured to be inserted into a corresponding recess by moving the outer cup and the lid towards each other along the longitudinal axis of the assembly.

According to the invention, the outer cup may provide a support surface configured to support the liner flange. The support surface may extend along the one or more protrusions and/or the one or more recesses.

The support surface may extend from a first plane to a second plane. The first and/or second plane may be perpendicular to the longitudinal axis. The first and second planes may be parallel to each other. Said first and second planes may be spaced apart from each other in the longitudinal direction of said longitudinal axis. For example, the first and second planes may be spaced from each other by at least 2 mm, at least 3 mm, or at least 4 mm. In some cases, the first and second planes may be inclined with respect to each other, for example at different angles with respect to the longitudinal axis.

The support surface may face upwardly when the outer cup stands on its base. The support surface may be provided by a top surface and/or rim of the outer cup. The support surface may be wavy. Such wavy support surface may be undulating and/or devoid of sharp bends along its peripheral extension. Alternatively, the support surface may be provided with one or more sharp bends.

The lid may comprise an abutment surface configured to contact the liner, in particular the liner flange, at least along segments thereof. The abutment surface may extend along the one or more protrusions and/or the one or more recesses. The abutment surface may face in a downward direction when the lid is assembled onto the liner and/or the outer cup.

The abutment surface may serve to press the liner, in particular the liner flange, against the support surface of the outer cup. The abutment surface may extend from a first plane to a second plane. The first plane and/or the second plane may be perpendicular to the longitudinal axis of the assembly. The first and second planes may be parallel to each other. The first and second planes may be spaced apart from each other in the longitudinal direction of said longitudinal axis, for example by at least 2 mm, at least 3 mm, or at least 4 mm. In some cases, the first and second planes may be inclined with respect to each other, for example at different angles with respect to the longitudinal axis.

The abutment surface may be wavy. In particular, when also the support surface is wavy, the wavy shape of the abutment surface may be formed to correspond to the wavy shape of the support surface. Such wavy abutment surface may be undulating and/or devoid of sharp bends along its peripheral extension. Alternatively, the abutment surface may be provided with one or more sharp bends.

The abutment surface and/or the support surface may extend around the longitudinal axis. When viewed in a cross section parallel to the longitudinal axis of the assembly, the abutment surface and/or the support surface may be perpendicular to said longitudinal axis, preferably at each such longitudinal cross section.

Regardless whether they are provided on the lid and/or the outer cup, each of the one or more protrusions and/or each of the one or more keyed features of the liner may extend circumferentially around the longitudinal axis. Measured in a plane perpendicular to said longitudinal axis, each of the one or more protrusions may subtend an arc angle around said longitudinal axis of at least 10°, at least 20°, or at least 30°. Alternatively or additionally, the arc angle subtended by the one or more protrusions and/or by the one or more keyed features of the liner, as measured from the longitudinal axis in a plane perpendicular to said longitudinal axis, may be 180° or less, 120° or less, or 90° or less.

The fluid delivery assembly according to the invention may comprise a collar. Such collar may facilitate assembly of the fluid delivery assembly. However, such collar may also be dispensed with depending on the design chosen for the connection between the lid and the outer cup. The collar may be configured to hold the lid to the cup. Such collar preferably is movable with respect to the lid. The collar may be configured to be screwed and/or snap-fitted to the outer cup. As such, the collar could also be referred to as a screw-on collar.

The collar may be a separate element. It is preferred in the context of the present invention, however, to use a collar which is snap-fitted to the lid. More specifically, the collar may be snap-fitted between the peripheral flange of the lid and one or more holding protrusions extending from the lid's peripheral portion. Lids embodying a screw-on collar which is snap-fitted thereto are disclosed in, for example, WO 2017/123708 A1 to Hegdahl et al. entitled "Spray Gun Cups, Receptacles, and Methods of Use"; WO 2017/123707 A1 to Pitera et al. entitled "Modular Spray Gun Lid Assemblies and Methods of Design and Use"; WO 2017/123709 A1 to Hegdahl et al. entitled "Spray Gun Cups, Receptacles, Lids, and Methods of Use"; and U.S. patent application Ser. No. 15/375,556 to Hegdahl et al. entitled "Reservoir Systems for Hand-Held Spray Guns and Methods of Use", the disclosures of which are hereby incorporated by reference in their entirety.

The screw-on collar (whether snap-fitted or not) may be rotatable with respect to the lid. More specifically, the screw-on collar may be provided with an internal and/or with an external first threading that threadingly engages with a complementary second threading provided on the outer cup. The first and/or second threading does not have to be continuously formed, but may be provided by at least one and preferably a plurality of segments extending around the screw-on collar and/or the outer cup. Each segment preferably extends for an arc of less than 80°, less than 60°, less than 45°, or even less than 40° around a periphery of the screw-on collar and/or around a periphery of the outer cup, respectively. Such comparatively short rotation of the screw-on collar may further facilitate assembly.

The lid, in particular the lid's peripheral portion, may be provided with a first lid stop feature to limit rotation of the screw-on collar with respect to the lid in a first direction and/or with a second lid stop feature to limit rotation of the screw-on collar with respect to the lid in the opposite, second direction. The lid stop feature may be provided, for example, by a protrusion extending from the lid's peripheral portion, which can be the holding protrusion that is used to snap-fit the collar to the lid. Alternatively, one or both of the lid stop features could be provided as a recess. The screw-on collar may comprise a corresponding collar stop feature to limit rotation of the collar with respect to the lid. The collar stop feature may be provided by a protrusion and/or by a recess of the collar.

According to a further aspect, the invention relates to a liner for a fluid delivery assembly for a spraying apparatus, in particular a gravity fed spray gun. The liner comprises a liner peripheral sidewall and a liner flange extending from said peripheral sidewall. One or more keyed features are pre-formed into the liner, in particular into a liner flange and/or into a liner peripheral sidewall, the keyed feature being configured to limit rotation of the liner in the fluid delivery assembly. The one or more keyed features may be provided by one or more bulges formed into the liner flange and/or the liner peripheral sidewall. The one or more keyed features may be configured to prevent rotation of the liner in the fluid delivery assembly.

The keyed feature preferably is at least one of configured to be received in a recess of an outer cup or lid of the fluid delivery assembly and/or configured to extend over a protrusion of such outer cup or lid of the fluid delivery assembly.

The liner, outer cup and/or lid in accordance with this further aspect may be configured in the manner described hereinbefore. Accordingly, all of the above-described features may be applicable to the liner, outer cup and/or lid also in the context of this further aspect, and vice-versa.

As mentioned above, the fluid delivery assembly may have a longitudinal axis. The liner flange may extend from a first plane to a second plane, the first and second planes preferably being perpendicular to the longitudinal axis. The first and second planes may be spaced apart from each other in the longitudinal direction of said longitudinal axis by at least 2 mm, at least 3 mm, or at least 4 mm. The keyed feature may extend to the second plane, in particular from the first to said second plane.

A trajectory along which the liner flange arcuately extends around the liner (in particular, around the liner peripheral sidewall) may include at least one first segment that extends perpendicularly or obliquely to the first plane. The first segment may extend in a third plane that passes through the inner volume of the liner. The trajectory of the liner flange around the liner may further include at least one second segment that extends in the second plane. The second segment preferably is longer than the first segment. The trajectory of the liner flange around the liner may include at least one third segment that extends in the first plane.

According to a further aspect, the invention relates to a set of at least two liners for a fluid delivery assembly for a spraying apparatus, in particular for a gravity fed spray gun. The two liners of such set may be sold together or separately. The set comprises a first liner and a second liner, both being formed in accordance with the description of the liner provided for the preceding aspects. The first liner has a first inner volume for paint while the second liner has a second inner volume for paint, the first inner volume being different from the second inner volume, wherein the first liner preferably comprises a first keyed feature and the second liner preferably comprises a second keyed feature. The keyed features and/or their arrangement preferably are different from each other. For example, the first keyed feature may subtend a first arc angle and the second keyed feature may subtend a second arc angle, the first arc angle being different from the second arc angle. Alternatively or additionally, the distribution (e.g., the spacing) and/or the number of the keyed features may be different. In this manner, a specific design of the one or more keyed features can be selected in accordance with the volume of the liner. By providing a corresponding design on the outer cup and/or on the lid, it may be ensured that liners of certain volumes are used with appropriately dimensioned outer cups and/or lids.

BRIEF DESCRIPTION

Figure 2:
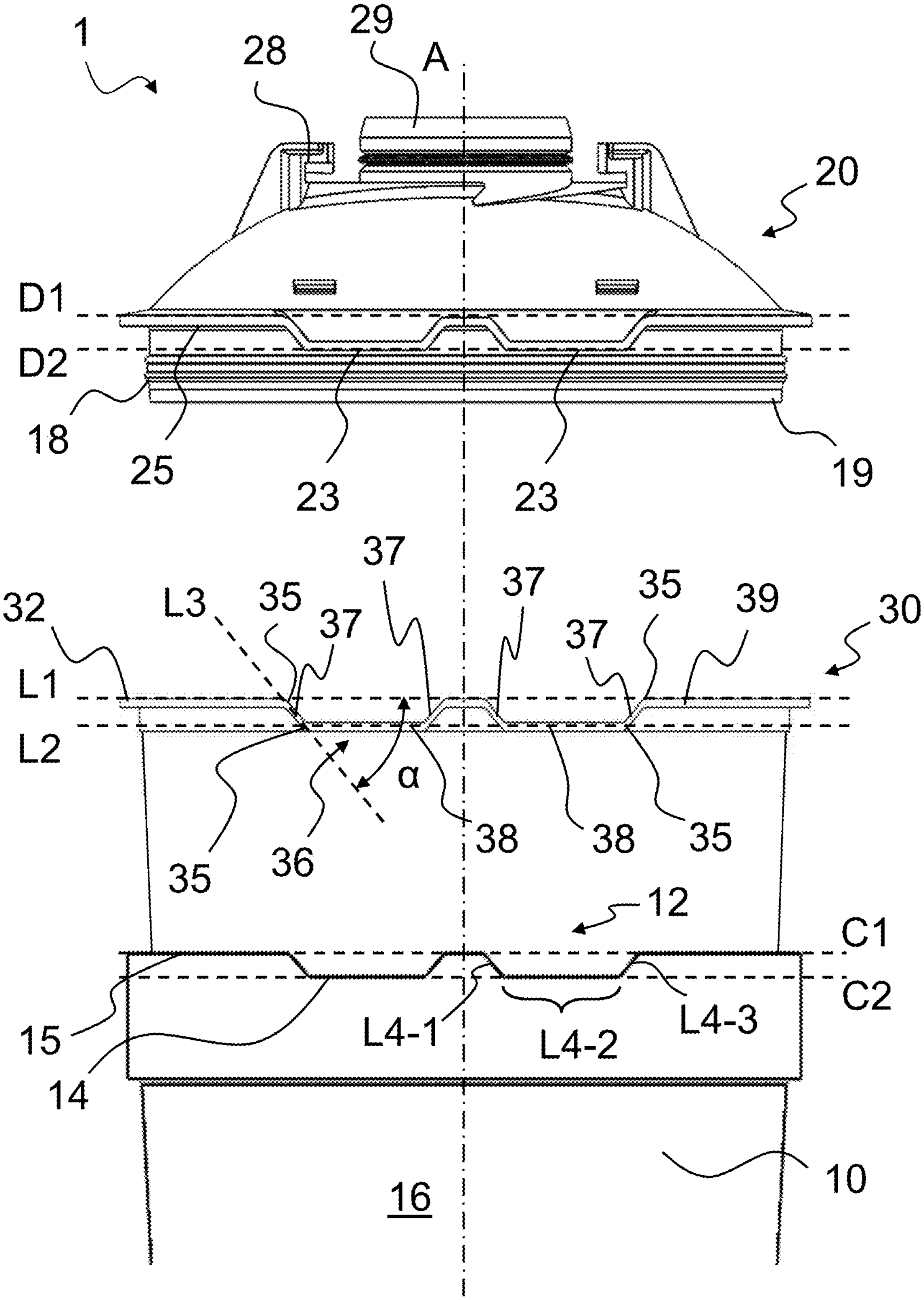
Figure 3:
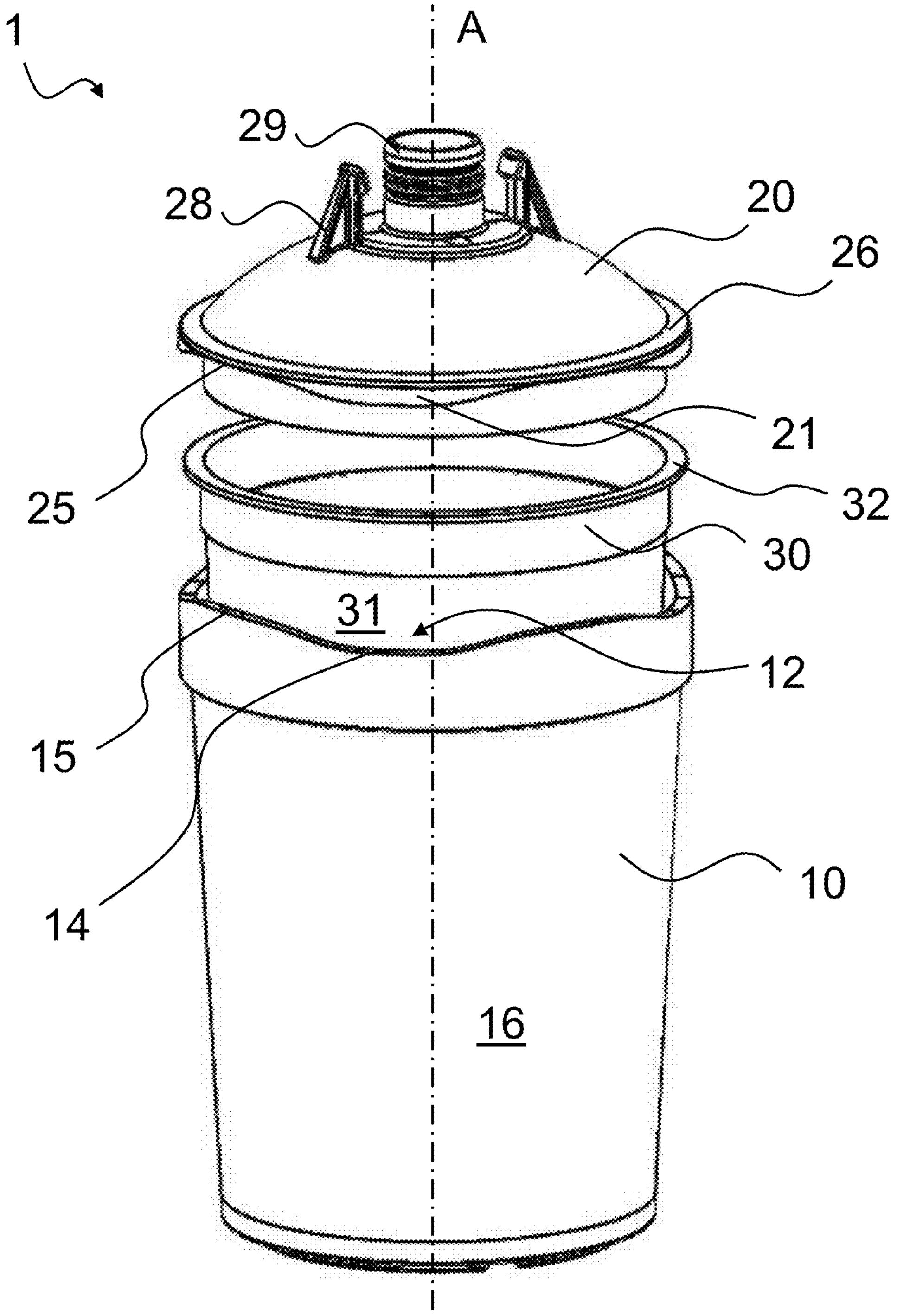
Figure 4:
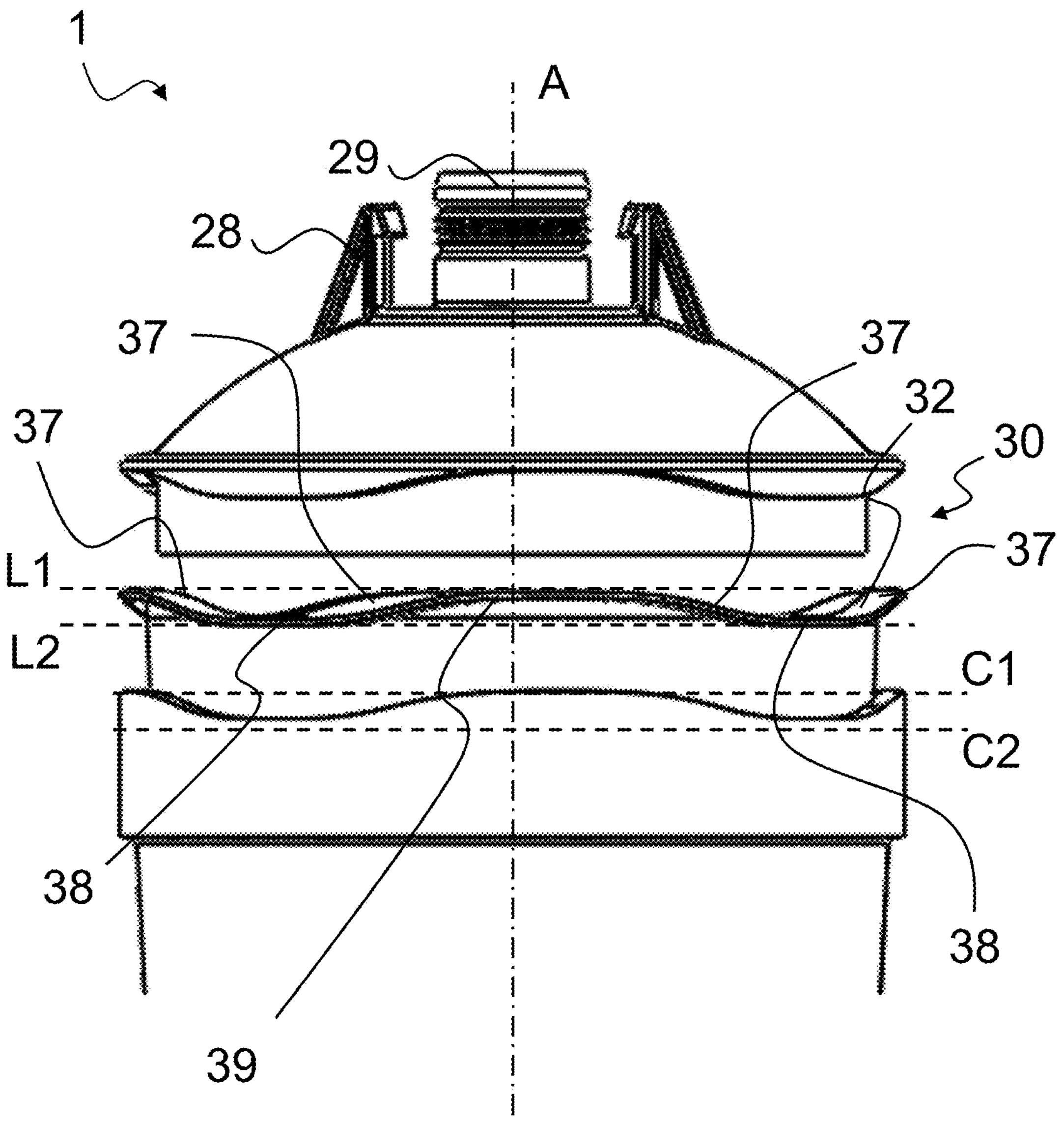
Figure 5:
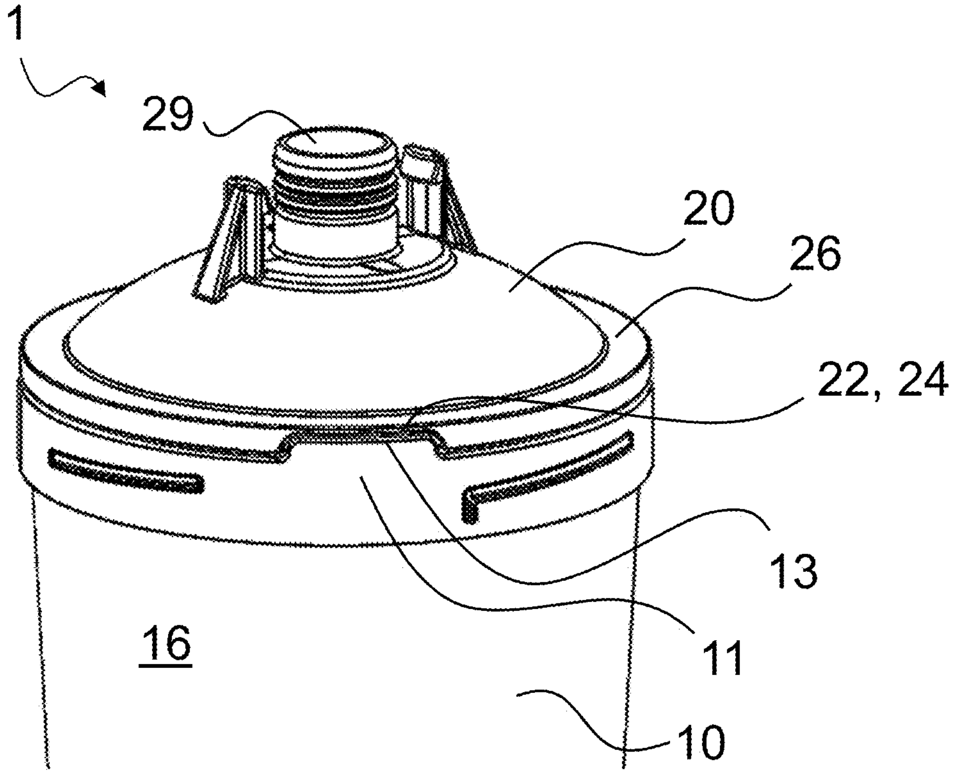
Figure 6:
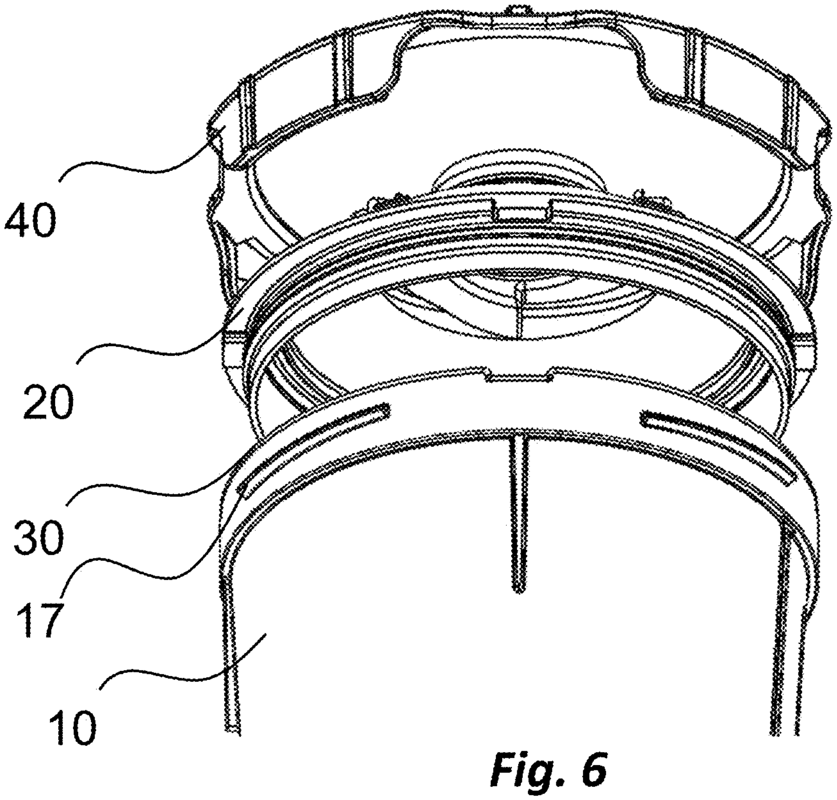
Figure 7:
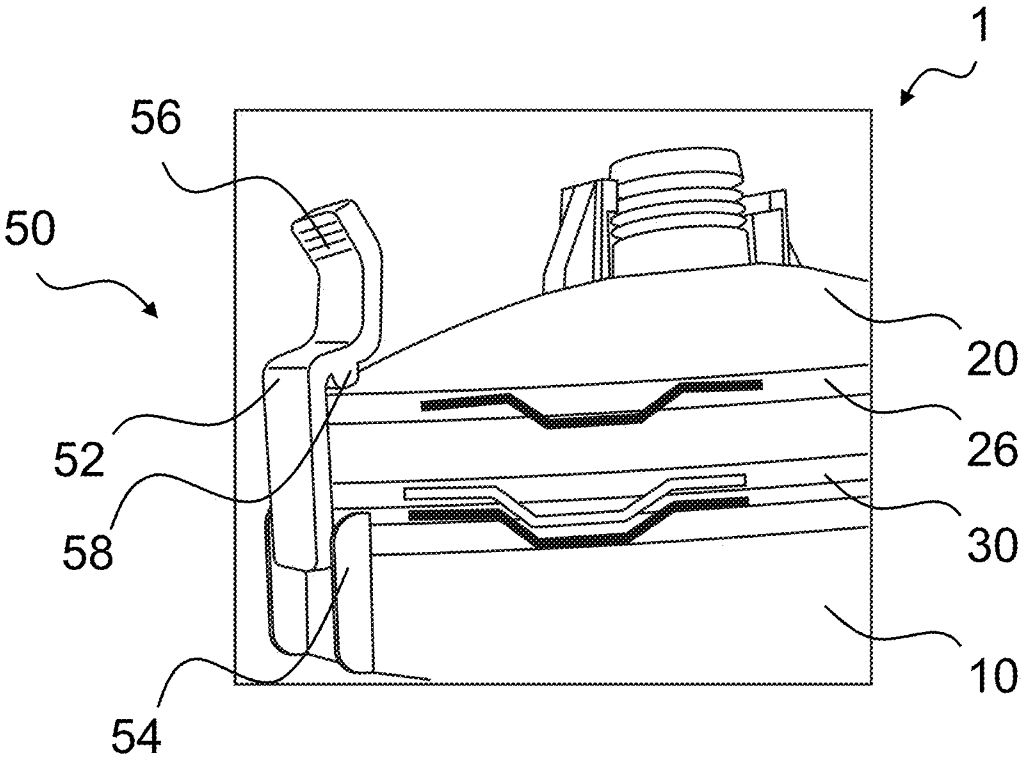
Figure 8:
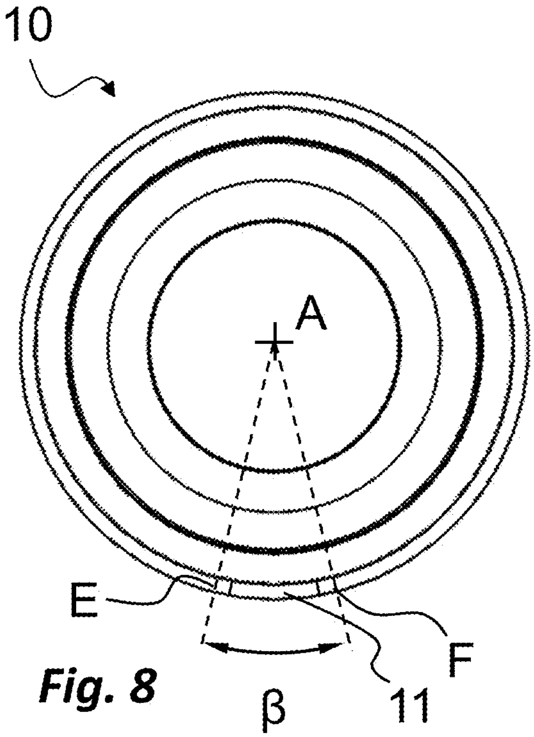
Figure 9A:
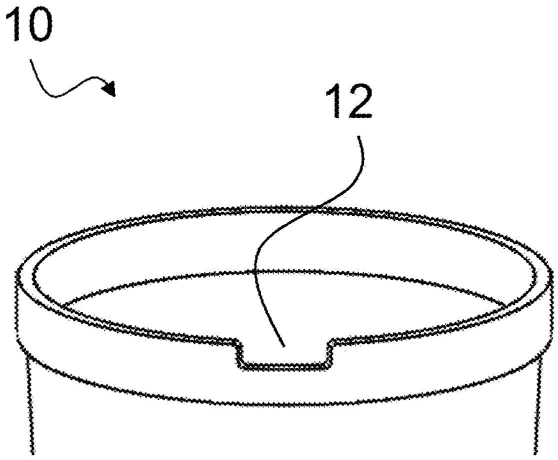
Figure 9B:
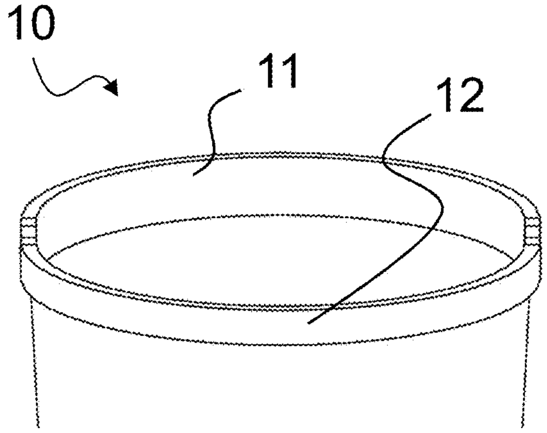
Figure 9C:
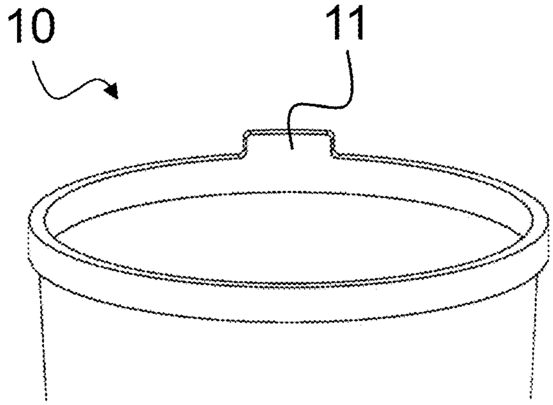

The appended figures that are described below disclose embodiments of the invention for illustrational purposes only. In particular, the disclosure provided by the figures is not meant to limit the scope of protection conferred by the invention. The figures are schematic drawings only and embodiments shown may be modified in many ways within the scope of the claims. The figures show:

FIG. 1 a perspective view of a fluid delivery assembly of the present invention with the components of the assembly being shown partially exploded;

FIG. 2 a partially exploded front view of the fluid delivery assembly of FIG. 1;

FIG. 3 a perspective view of the fluid delivery assembly of to the present invention according to a variation, again shown in a partially exploded state;

FIG. 4 a partially exploded front view of the fluid delivery assembly of FIG. 3;

FIG. 5 a perspective view of a fluid delivery assembly of to the present invention according to a further variation;

FIG. 6 a further perspective view of a fluid delivery assembly of to the present invention illustrating a collar;

FIG. 7 a detail which exemplifies in a schematically manner a connection between an outer cup and a lid according to the present invention by latching members;

FIG. 8 a schematic top view of the outer cup according to the variation of FIG. 5 illustrating the angle subtended by a protrusion;

FIG. 9A a perspective view of an outer cup according to a further variation;

FIG. 9B a perspective view of an outer cup according to a further variation;

FIG. 9C a perspective view of an outer cup according to a further variation.

DETAILED DESCRIPTION

FIG. 1 shows a fluid delivery assembly 1 according to the present invention. The fluid delivery assembly 1 comprises an outer cup 10, a lid 20 and a liner 30. The assembly 1 may have a longitudinal axis A along which the outer cup 10, the lid 20 and the liner 30 are assembled together.

The outer cup 10 may have a peripheral sidewall 16. The peripheral sidewall 16 delimits an opening into which the liner 30 can be inserted in order to arrange it in the outer cup 10. The liner 30 can be arranged in the outer cup 10, for example, for mixing a batch of paint therein (e.g., from different paint components). The liner 30 may form an open upper end and may have a closed liner base (not shown). The liner base may be liquid-tight and/or devoid of holes in order to maintain the paint in the liner 30. The outer cup 10 may be configured to support the liner 30 when mixing the paint. This may facilitate the filling of paint into the liner 30 through its open upper end. The liner base and the liner sidewall 31 may be integrally formed with each other, for example by thermo/vacuum forming the liner 30.

A liner flange 32 may be integral with the liner sidewall 31, for example when thermo/vacuum forming the liner 30. Such integral liner flange 32 could be formed by thermo/vacuum forming. For example, such integral liner flange 32 could be integrally formed with the liner sidewall 31, e.g. in a single step with the liner sidewall 31 when thermo/vacuum forming the liner 30 (e.g. from a sheet of polymeric material). During such single thermo/vacuum forming step, also a keyed geometry could be provided in the liner 30, in particular in the liner flange 32. After forming the liner flange 32, in particular after forming the liner flange 32 in a thermo/vacuum forming step, the liner flange 32 may be trimmed.

Alternatively or additionally, a keyed geometry could be provided in the liner 30, in particular in the liner flange 32, in one or more subsequent steps after having formed the liner flange 32. For example, a liner 30 with a liner flange 32 could be formed (which may be integrally formed with the liner sidewall 31). Thereafter, in a subsequent step, the liner flange 32 could be heated or re-heated and the keyed geometry could be formed into the softened liner flange 32. For example, the softened liner flange 32 could be shaped in a die (or between two dies), e.g. in a press, and/or it could be shaped by clamping.

As shown in FIG. 1, the liner flange 32 may extend arcuately around at least a segment of the liner 30, preferably around the entire liner 30. As will be appreciated from the figures, the liner flange 32 preferably has a non-planar geometry.

The peripheral sidewall 16 may provide a support surface 15 on which the liner 30 is supported in the outer cup 10, for example via the liner flange 32. As shown, the support surface 15 may be formed by an upper end surface of the peripheral sidewall 16. However, this is not necessarily the case. For example, the peripheral sidewall 16 may also comprise a stepped configuration (e.g., proximate to its upper end; not shown in the figures). The support surface 15 preferably faces in an upward direction along the longitudinal axis A.

When the liner 30 is arranged in the outer cup 10, the liner sidewall 31 and/or the liner base may be arranged proximate to the sidewall 16 and/or a base of the outer cup 10, respectively. In this manner, a more thorough mixing of the paint may be possible. In some cases, such configuration may help to prevent a user from perforating the liner 30 with a mixing implement (not shown). In particular, the outer cup sidewall 16 and/or the outer cup base may be configured to limit a maximum extent to which the liner 30 can be deformed by such mixing implement. Optionally, the liner sidewall 31 may correspond in shape to the sidewall 16 of the outer cup 10.

After a batch of paint has been prepared, the lid 20 may be arranged on the liner 30 and/or on the outer cup 10. The lid 20 may be configured to close the liner's open upper end. The lid 20 may comprise a lid flange 26 which may extend in a radially outward manner. The lid 20 may comprise an abutment surface 25 configured to contact the liner flange 32. More specifically, the abutment surface 25 may be provided along the lid flange 26 and the lid flange 26 may be configured for being pressed against the liner flange 32 when the assembly 1 is assembled. The abutment surface 25 may face in a downward direction along the longitudinal axis A.

As illustrated in more detail in FIG. 2, the lid 20 may be provided with one or more sealing features configured seal with the liner 30 in a fluid- and/or air-tight manner when the lid 20 is arranged on the liner 30. For example, the lid 20 may comprise a cylindrical portion 19 configured to be inserted into the liner 30. One or more annular sealing projections 18 that engage with an inner surface of the liner 30, in particular with the liner's peripheral sidewall 31, may be provided along said cylindrical portion 19.

A fluid outlet 29 may be formed in the lid 20 for coupling the lid 29 to a paint inlet of a paint spray gun (not shown) so that the paint contained in the liner 30 can be sprayed. In particular, the fluid outlet 29 may be configured for connecting the lid 20, directly or via an adapter (not shown), to the paint inlet of a gravity fed paint spray gun. The fluid assembly 1 is preferably inverted when connected to such gravity fed spray gun. In other words, when the gun is held in a normal operating position with the nozzle pointing horizontally, the liner 30 preferably is arranged entirely or at least partially above the fluid outlet 29.

The lid 20 may be provided with one or more hook coupling means 28 (e.g., one or more pairs of hook coupling means 28), for example in the region of the fluid outlet 29. The hook coupling means 28 may be configured for connecting the lid 29 directly to the gun or to an adapter connected with such gun. The hook coupling means 28 are preferably spaced apart from the fluid outlet 29.

The liner 30 may be self-supporting, which may be helpful for mixing the paint directly in the liner. For example, such self-supporting nature of the liner 30 may avoid the liner 30 from entangle and/or being dragged around with the mixing implement when mixing the paint. At the same time, the liner 30 may be configured to collapse when spraying the paint via the gun, i.e. as fluid is withdrawn by the gun through the fluid outlet 29.

The fluid delivery assembly 1 may further comprise a collar 40 for holding the lid 20 and liner 30 together (see FIG. 6). Such collar 40 may be a screw-on collar provided with a first threading (e.g. an inner threading; not shown in the drawings) that engages with a second threading 17 (e.g. an outer threading) of the outer cup 10. The first and/or the second threading may comprise several separate segments. Alternatively, the outer cup 10 may comprise an additional, separate mounting ring (not shown) with the liner 30 being entrapped between said mounting ring and the lid 20, as it is known in the art (see, e.g., the "Norton Paint System" by Norton Abrasives GmbH, Wesseling, Germany). In this case, the collar 40 could be configured to engage with the mounting ring. Alternatively or additionally, the collar 40 could be snap-fitted to the liner 30, to the outer cup 10, and/or to the mounting ring.

Furthermore, such collar 40 could also be omitted, for example when the lid 20 itself is configured to be snap-fitted to the outer cup 10, to the liner 30, and/or to the mounting ring, or when the lid 20 itself is provided with a threading (not shown) that is configured to engage with a corresponding threading of the outer cup 10, the liner 30, and/or the mounting ring. One possible example for such configuration is shown in FIG. 7, wherein a detail of the fluid delivery assembly 1 can be seen. In this case, the lid 20 is provided with one or more latching members 50. Preferably, two or more such latching members 50 are present, which may be spaced around the circumference of the lid 20. The one or more latching members 50 may be formed as hooks, which in this case are exemplified as resilient hooks 52 that are integrally connected to and/or molded with the lid at a hinge 58 (e.g. an integral hinge). However, the one or more hooks 52 could also be foldable hooks and/or could be separately molded and connected to the lid 20, for example via a hinge axis and/or pin. The hooks 52 may engage the outer cup 10, for example by grasping over a top portion over said outer cup 10. For example, the outer cup 10 may be provided with one or more undercuts 54 (e.g. along an outer surface of the outer cup 10) into which the hooks 52 (for example a lock pawl thereof) may engage. Thereby, the lid 20 may be pressed onto the liner 30 and/or onto the outer cup 10.

The hooks 52 may be provided, for example at the end opposite to the end engaging with the outer cup 10, with an actuation tab 56 that is configured for being grasped with a hand of the user.

The skilled person will recognize based on the present disclosure that the latching members 50 could also be integrally molded with and/or hinged at the outer cup 10. In this case, they may grasp over the lid 20, for example over the lid flange 26.

The outer cup 10 may be present when spraying the paint. However, the outer cup 10 may also be removable from the connected lid 20 and liner 30 combination and/or separable from the remaining fluid delivery assembly 1.

According to the invention, the fluid delivery assembly 1 may comprise an interlocking keyed geometry adapted to prevent rotation of at least one of the lid 20 and the liner 30 with respect to the cup 10. The interlocking keyed geometry may comprise one or more protrusions on the outer cup 10 extending into one or more respective recesses of the lid 20 and/or one or more protrusions of the lid 20 extending into one or more respective recesses of the outer cup 10 such that the liner 30 is trapped or clamped between the one or more protrusions and the one or more recesses.

In the exemplary embodiment illustrated in FIGS. 1 and 2, the lid 20 is provided with a protrusion 21 that extends into a recess 12 of the outer cup 10. As shown, the recess 12 may be provided along the support surface 15 of the outer cup. The recess 12 may be open in an upward direction along the longitudinal axis A. The support surface 15 may extend along the recess 12.

More specifically, the recess 12 may extend into the peripheral sidewall 16 of the outer cup 10 in a radial direction and/or along the longitudinal axis A. The recess 12 may be delimited by a recess peripheral wall 14. The liner flange 32 preferably contacts said peripheral wall 14.

For example, the recess peripheral wall 14 may extend along an arcuate length that corresponds to the sum of the lengths L4-1, L4-2 and L4-3 indicated in FIG. 2. The liner flange 32 preferably contacts the recess peripheral wall 14 at least along 50%, 60% or 80% of said arcuate length. As shown, the fluid delivery assembly 1 preferably comprises a plurality of such recesses 12. When an additional mounting ring is used, the one or more recesses 12 may be provided in the mounting ring.

The projection 21 may extend from the lid flange 26, for example in a downward direction along the longitudinal axis A, for example by at least 2 mm or at least 3 mm. The protrusion 21 may be considered to protrude in a non-radial manner. The abutment surface 25 may extend also along the protrusion 21. The fluid delivery assembly 1 preferably comprises a plurality of such protrusions 21.

The liner 30, in particular the liner flange 32, may be provided with one or more corresponding keyed features 36. The one or more keyed features 36 are preferably preformed into the liner, for example during a thermo/vacuum forming thereof and/or in a subsequent production step. In other words, the keyed features 36 preferably are present already before assembling the fluid delivery assembly 1. However, alternatively or additionally, the liner sidewall 31 and/or the liner flange 32 may also be made from a semi-flexible or flexible material that may allow the keyed feature 36 to be formed in the liner sidewall 31 and/or in the liner flange 32 by deforming the liner 30 when assembling the fluid delivery assembly 1. For example, the liner 30, in particular the liner flange 32, may be deformed by the protrusion 21 into the recess 12. As such, the liner flange 32 may be straight and/or planar in an initial configuration (i.e., before assembling the assembly 1), as schematically illustrated in FIG. 3. When the assembly 1 is assembled, the liner flange 32 may be deformed into a deformed configuration, for example into a wavy configuration that is schematically illustrated in FIG. 4 and/or one or more keyed features 36 may be formed into the liner flange 32 (see FIGS. 1 and 2).

The one or more keyed features 36 may be configured to be located in a respective recess 12 when the liner 30 is inserted into the outer cup 10. In this manner, the keyed feature 36 may be configured to interlock with the recess 12 to prevent rotation of the liner 30 in the outer cup 10 when mixing the paint and/or when assembling the lid 20 onto the liner 30.

When the outer cup 10 and the lid 20 are assembled, the one or more keyed features 36 may be trapped between a respective recess 12 of the outer cup 10 and a respective protrusion 21 of the lid 20 (or, when the outer cup comprises a separate mounting ring, between the lid and the mounting ring). In particular, the protrusion 21 may be configured to extend into the recess 12 and/or into the keyed feature 36, in particular when the cup 10 and lid 20 are moved together along the longitudinal axis A. Differently worded, the liner 30, in particular the liner flange 32, may extend around the protrusion 21. The protrusion 21 may comprise a downwardly facing end surface 23 (see FIG. 2). The liner 30, in particular the liner flange 32, may extend around said end surface 23. The sealing features 18 of the lid 20 may be positioned below the protrusion 21. In particular, the sealing features may be positioned below the downwardly facing end surface 23, but also other positions are possible. Alternatively or additionally, the lid 20 may comprise a separate o-ring seal (not shown) that is provided on the lid (e.g. within a preformed groove) or an overmolded seal (e.g. an overmolded ring) that is preferably provided to the lid 20 during an additional molding step (e.g., by injection molding with a different material, which may be softer than that of the lid).

With such interlocking geometry, the risk of an inadvertent rotation of the lid 20 with respect to the outer cup 10 and/or the liner 30, which could lead to spilling of the paint provided in the liner, may be significantly reduced. This may be helpful when connecting the fluid outlet 29 to the inlet of the spray gun. In particular, establishment of a fluid- and/or air-tight connection between the fluid outlet 29 and the inlet of the gun may require a forceful relative rotation between the lid 20 and the gun. The keyed geometry may hold the cup 10, lid 20 and liner 30 more securely together during such rotation. In particular, the keyed geometry may allow the user to grab the outer cup 10 with the hand and then securely rotate the lid 20 together with the outer cup 10 for connecting the fluid outlet 29 to the inlet of the gun.

As illustrated in more detail in FIGS. 2 and 4, the liner flange 32 may extend from a first plane L1, which preferably is perpendicular to the longitudinal axis A, to a second plane L2, which preferably is perpendicular to the longitudinal axis A.

The first and second planes L1, L2 may be spaced apart from each along the longitudinal axis A by at least 2 mm, preferably at least 3 mm. The keyed feature 36 of the liner 30 may extend from the first plane L1 to the second plane L2. As such, the first and second planes L1, L2 preferably are parallel to each other. However, in variations of the embodiment, they could also be inclined with respect to the longitudinal axis A and/or with respect to each other. For example, the first and second planes L1, L2 could be inclined with respect to the longitudinal axis A at different angles.

The liner flange 32 may extend around the liner 30 with at least one first segment 37 that extends perpendicularly or obliquely to the first plane L1. Said first segment 37 may extend at an angle α of at least 10°, at least 20° or at least 30° with respect to the first plane L1. The first segment 37 may be at least 2 mm, at least 3 mm, or at least 4 mm long. Alternatively or additionally, the first segment 37 preferably is 15 mm long or shorter, 10 mm long or shorter, or 7 mm long or shorter. As shown in FIGS. 1 to 4, the liner flange 32 preferably includes a plurality of such first segments 37. The one or more first segments 37 may extend in a third plane L3 that passes through the inner volume of the liner 30.

Additionally or alternatively, the liner flange 32 may extend around the liner 30 with at least one second segment 38 that extends in the second plane L2. The second segment 38 may be longer than the first segment 37. For example, the second segment 38 may be at least 5 mm long, at least 7 mm long, or at least 10 mm long. Alternatively or additionally, the second segment 38 preferably is 40 mm long or shorter, 30 mm long or shorter, or 20 mm long or shorter. The liner flange 32 preferably comprises a plurality of second segments 38.

As further apparent from FIGS. 2 and 4, the liner flange 32 may also include one or more third segments 39. In particular, the liner flange 32 may extend around the liner 30 with at least one third segment 39 that extends in the first plane L1.

According to the exemplary embodiment illustrated in FIGS. 1 and 2, the liner flange 32 may be angled at one or more locations. In particular, the liner flange 32 may include one or more angled portions or sharp bends 35. The liner flange may transition from the one or more first segments 37 into the one or more second segments 38 and/or into the one or more third segments 39 at said angled portions 35.

All three segments are optional and do not necessarily extend in a straight manner. For example, one or more of the first, second and third segments may be partially or entirely curved, for example when the liner flange 32 is wavy.

As further shown in FIGS. 2 and 4, the support surface 15 of the outer cup 10 may extend from a first plane C1 to a second plane C2. The first plane and/or the second plane preferably is perpendicular to the longitudinal axis A. Preferably, both planes C1, C2 are parallel to each other. The planes C1, C2 may be spaced apart from each other in the longitudinal direction of said longitudinal axis A, for example by at least 2 mm or at least 3 mm. In variations of the embodiment, the planes C1, C2 could also be inclined with respect to the longitudinal axis A and/or with respect to each other. For example, the first and second planes C1, C2 could be inclined with respect to the longitudinal axis A at different angles. The first plane C1 of the outer cup 10 preferably is parallel to the first plane L1 of the liner 30 and/or the second plane C2 of the outer cup 10 preferably is parallel to the second plane L2 of the liner 30.

With further reference to FIG. 2, it will be appreciated that the abutment surface 25 of the lid 20 may extend from a first plane D1 to a second plane D2, with said first plane D1 and/or said second plane D2 preferably being perpendicular to the longitudinal axis A. Preferably, both planes D1, D2 are parallel to each other. The planes D1, D2 may be spaced apart from each other along the longitudinal axis A, for example by at least 2 mm or at least 3 mm. In variations of the embodiment, the planes D1, D2 could also be inclined with respect to the longitudinal axis A and/or with respect to each other. For example, the first and second planes D1, D2 could be inclined with respect to the longitudinal axis A at different angles. The first plane D1 of the lid 20 preferably is parallel to the first plane C1 of the outer cup 10 and/or to the first plane L1 of the liner 30. The second plane D2 of the lid 20 preferably is parallel to the second plane C2 of the outer cup 10 and/or to the second plane L2 of the liner 30.

Turning to FIGS. 3 and 4 a variation of the fluid delivery assembly 1 is shown wherein the outer cup 10 is provided with a wavy and/or undulating support surface 15. Furthermore, the lid 20 may be provided with a correspondingly wavy and/or undulating abutment surface 25 for interlocking with said support surface 15. The undulations provided to the support surface 15 and the abutment surface 25 may correspond to each other in the number of recesses/protrusions, in the length and/or shape of the recesses/protrusions, and/or in the phase at which they undulate. Such undulating surfaces may be devoid of sharp bends. The support surface 15 and/or the abutment surface 25 may be undulated along their entire circumference or only along a segment thereof.

The liner 30, in particular the liner flange 32, may be pre-formed with a corresponding undulation and/or waviness (see the shape of the liner flange 32 shown in FIG. 4). However, as shown in FIG. 3, also a liner 30 with a planar liner flange 32 may be employed. The liner 30, in particular the liner flange 32, may then be deformed by pressing the lid 20 onto the outer cup 10.

FIG. 5 shows a fluid delivery assembly 1 according to a further variation. In this case the outer cup 10 is provided with the one or more protrusions 11 while the lid 20 comprises the one or more recesses 22 for receiving said protrusions 11. More specifically, the one or more protrusions 11 may extend from the peripheral sidewall 16 of the outer cup 10. Each protrusion 11 may be configured to engage into a corresponding recess 22 and/or with a corresponding keyed feature of the liner 30 (not shown in FIG. 5). Alternatively or additionally, the one or more protrusions 11 may deform the liner 30, in particular the liner flange 32, into the corresponding recess 22.

Each protrusion 11 may comprise an upwardly facing end surface 13 that may abut with the liner, in particular with a keyed feature of the liner 30. The liner 30 may be configured to extend around said end surface 13. When an additional mounting ring is used, the protrusion 11 may be provided in said mounting ring.

As further shown in FIG. 5, the one or more recesses 21 may be located in the lid flange 26. The recesses 21 may comprise a downwardly facing peripheral wall 24 that may be configured to abut with the liner 30 when the assembly 1 is assembled.

The one or more protrusions 11, 21 and/or the one or more recesses 12, 22 of the outer cup 10 and/or of the lid 20, as well as—optionally—also the one or more keyed features 36 of the liner 30, may each be considered to subtend an arc angle β around the longitudinal axis A. In an exemplary manner, such arc angle β is shown in FIG. 8 for the outer cup 10 of FIG. 5. The arc angle β preferably is measured in a plane perpendicular to the longitudinal axis. The arc angle β preferably is measured in such plane between lines extending radially from the longitudinal axis A to a starting point E and an end point F of the protrusion 11, 21. The arc angle β preferably is at least 10°, at least 20°, or at least 30°. Additionally or alternatively, the arc angle preferably is 180° or less, 120° or less, or 90° or less.

FIGS. 9A to 9C show different outer cups 10 with protrusions and/or recesses extending over various arc angles. For example, in FIG. 9A a recess 12 extends over approximately 15°. In FIG. 9B, a recess 12 extends over approximately 180° while a protrusion 11 extends over approximately 180°. In FIG. 9C, a protrusion 11 extends over approximately 15°.

When providing sets of outer cups 10 and lids 20 for different volumes, the outer cup 10 and lid 20 for a first volume preferably have a corresponding interlocking geometry. In particular, such outer cup 10 and lid 20 for the first volume may have one or more recesses and one or more corresponding protrusions, in particular recesses and protrusions subtending the same arc angle β, recesses and protrusions that have the same distribution around the longitudinal axis, the same number of recesses and protrusions, and/or recesses and protrusions that correspond in shape and/or phase with each other. Depending on the specific implementation, a correspondence of the one or more recesses and one or more protrusions in one of these features (arc angle, distribution, number, shape and/or phase) may be sufficient. However, it is preferred that a correspondence in at least two, three or four of these features is provided.

When the liner 30 is pre-formed with one or more keyed features 36 (see above), also the one or more keyed features 36 of a liner 30 for said first volume may correspond to the recesses and protrusions in one or more (preferably two, three or four) of the above-mentioned features (i.e., arc angle, distribution, number, shape and/or phase).

Moreover, an outer cup 10 and lid 20 for a second volume that is different from the first volume are preferably provided with recesses and protrusions that differ in arc angle, distribution, number, shape and/or phase from those provided to the outer cup 10 and lid 20 for the first volume. Similarly, when the liner 30 is pre-formed with one or more keyed features 36, the pre-formed keyed features 36 in a liner for said second volume preferably differ in one or more of arc angle, distribution, number, shape and/or phase from those provided to the liner 30 for the first volume.

In other words, the outer cups 10, lids 20, and/or liners 30 for different volumes are preferably non-compatible with each other.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above. As far as the expressions "generally" or "substantially" are used, the present application is to be understood as disclosing these features and values also as entirely met, i.e. without the preceding characterization as "generally" or "substantially".

What is claimed is:

1. A liner (30) for a fluid delivery assembly (1) for a spraying apparatus, the liner (30) comprising a peripheral sidewall (31) and a liner flange (32) extending from the peripheral sidewall (31);

a pre-formed keyed feature (36), the keyed feature (36) being configured to limit rotation of the liner (30) in the fluid delivery assembly (1);

wherein the keyed feature (36) is at least one of configured to be received in a recess (12, 22) of an outer cup (10) or lid (20) of the fluid delivery assembly (1); or configured to extend over a protrusion (11, 21) of the outer cup (10) or the lid (20) of the fluid delivery assembly (1);

wherein the keyed feature (36) is pre-formed into the liner flange (32);

wherein the fluid delivery assembly has a liner longitudinal axis (A), and wherein the liner flange (32) extends from a first plane (L1) perpendicular to said liner longitudinal axis (A) to a second plane (L2) perpendicular to said liner longitudinal axis (A), wherein the first and second planes are spaced apart from each other in the longitudinal direction of the liner longitudinal axis (A).

2. The liner (30) according to claim 1, wherein the first and second planes are spaced apart from each other in the longitudinal direction of the liner longitudinal axis (A) by at least 2 mm.

3. The liner (30) according to claim 2, wherein the first and second planes are spaced apart from each other by at least 3 mm.

4. The liner (30) of claim 1, wherein the keyed feature (36) extends to the second plane.

5. The liner (30) according to claim 1, wherein a trajectory along which the liner flange (32) arcuately extends around the liner (30) includes at least a first segment (37) that extends perpendicularly or obliquely to a first plane (L1), the first plane (L1) being perpendicular to the liner longitudinal axis (A).

6. The liner (30) according to claim 5, wherein the first segment (37) extends in a third plane (L3) that passes through the inner volume of the liner (30).

7. The liner (30) according to claim 6, wherein the trajectory of the liner flange (32) around the liner (30) includes at least a second segment (38) that extends in the second plane (L2).

8. The liner (30) according to claim 7, wherein the second segment (38) is longer than the first segment (37).

9. The liner (30) according to claim 7, wherein the trajectory of the liner flange (32) around the liner (30) includes at least one third segment (39) that extends in the first plane (L1).

10. The liner (30) according to claim 5, wherein the first segment (37) extends at an angle ($\alpha$) of at least 10° with respect to the first plane.

11. A set of at least two liners for a fluid delivery assembly (1) for a spraying apparatus, the set comprising:

the first liner of claim 1; and a second liner (30);

wherein the first liner (30) has a first inner volume and the second liner (30) has a second inner volume, the first inner volume being different from the second inner volume;

wherein the first liner (30) comprises the first keyed feature (36) and the second liner (30) comprises a second keyed feature (36);

wherein the first keyed feature (36) subtends a first arc angle ($\beta$) and the second keyed feature subtends a second arc angle ($\beta$), the first arc angle ($\beta$) being different from the second arc angle ($\beta$).

* * * * *